United States Patent [19]
Kanda et al.

[11] Patent Number: 5,537,396
[45] Date of Patent: Jul. 16, 1996

[54] DIFFUSION CODE GENERATING METHOD FOR SPREAD SPECTRUM COMMUNICATION

[75] Inventors: Tetsuo Kanda; Katsuo Saito, both of Yokohama; Toshihiko Myojo, Tokyo; Ichiro Kato, Kawasaki; Norihiro Mochizuki; Hidetada Nago, both of Yokohama, all of Japan

[73] Assignee: Canon Kabushiki Kaisha, Tokyo, Japan

[21] Appl. No.: 247,937

[22] Filed: May 24, 1994

[30] Foreign Application Priority Data

May 28, 1993 [JP] Japan .................................. 5-151221

[51] Int. Cl.$^6$ .................................................. H04J 13/02
[52] U.S. Cl. ......................................... 370/18; 370/100.1
[58] Field of Search ................................... 370/18, 100.1, 370/105.4; 375/200, 205, 206, 208, 209

[56] References Cited

U.S. PATENT DOCUMENTS

| | | | |
|---|---|---|---|
| 4,494,238 | 1/1985 | Groth, Jr. ................................ | 375/200 |
| 5,204,877 | 4/1993 | Endo et al. ............................. | 375/200 |
| 5,228,055 | 7/1993 | Uchida et al. ......................... | 375/208 |
| 5,235,612 | 8/1993 | Stilwell et al. ........................ | 375/200 |
| 5,235,614 | 8/1993 | Bruckert et al. ...................... | 375/205 |
| 5,260,969 | 11/1993 | Kato et al. ............................. | 375/200 |
| 5,305,348 | 4/1994 | Izumi ..................................... | 375/200 |
| 5,377,227 | 12/1994 | Hurlbut et al. ........................ | 375/200 |
| 5,402,442 | 3/1995 | Ishigaki ................................. | 375/200 |
| 5,426,666 | 6/1995 | Kato ...................................... | 370/18 |

FOREIGN PATENT DOCUMENTS 0157692  10/1985  European Pat. Off. .

OTHER PUBLICATIONS

Varakin and Sidorova, *Systems of Orthogonal Phase–Shift Keyed Signals with Low First Peaks of the Correlation Function*, Telecommunications and Radio Engineering, No. 3, Mar. 1985, pp. 99–102.

Park, et al., *Temporal/Spatial Optical CDMA Networks–Design, Demonstration, and Comparison with Temporal Networks*, IEEE Photonics, Technology Letters, vol. 4, No. 10, Oct. 1992, pp. 1160–1162.

Patent Abstracts of Japan, vol. 12, No. 379 (E–667) 11 Oct. 1988 & JP–A–63 127 634 (Matsushita Electric Inc. Co. Ltd.) 31 May 1988.

Patent Abstracts of Japan, vol. 17, No. 283 (E–1373) 31 May 1993 & JP–A–50 014 313 (Nakamura Masaru) 22 Jan. 1993.

*Primary Examiner*—Douglas W. Olms
*Assistant Examiner*—Min Jung
*Attorney, Agent, or Firm*—Morgan & Finnegan

[57] ABSTRACT

A diffusion code generating method for a code division multiplex communication by a spread spectrum system is provided. A receiving apparatus according to the above method receives the signal which was multiplexed by using a plurality of sets of diffusion codes and comprises: a generator to generate a sync code and a plurality of sets of diffusion codes other than the sync code; a correlator to obtain a correlation between a reception signal and the sync code generated from the generator; and a receiver to receive the reception signal on the basis of the plurality of sets of diffusion codes generated from the generator. The generator generates the sync code in a manner such that the cross-correlation values are set to very small values at positions near a code sync point or are enough smaller than the autocorrelation peak of the sync code or are set to very small values at both of or either one of the positions before and after the code sync point.

20 Claims, 7 Drawing Sheets

GMW0 = ( 0111111011101001101011001100011111
1011100111001001010000001111011
1001111110001111010010011010100
0100101010000011101010011110
1001001010111101010000011010111
1011001011000111100010000110001000
0110000010011011001100001010100
01110100111001001100101011 )

FIG. 4B

GMW0   = ( 01111110111 ------ 10011001011 )
GMW1   = ( 10111111011 ------ 01001100101 )
GMW2   = ( 11011111101 ------ 00100110010 )
GMW3   = ( 01101111110 ------ 10010011001 )

⋮

GMW254 = ( 11111101110 ------ 00110010110 )

FIG. 4C

0GMW0   = ( 01111110111 ------ 100110010110 )
0GMW1   = ( 10111111011 ------ 010011001010 )
0GMW2   = ( 11011111101 ------ 001001100100 )
0GMW3   = ( 01101111110 ------ 100100110010 )

⋮

0GMW254 = ( 11111101110 ------ 001100101100 )

DIFFUSION CODE GENERATING METHOD FOR SPREAD SPECTRUM COMMUNICATION

BACKGROUND OF THE INVENTION

1. Field of the Invention

The present invention relates to a diffusion code generating method for a code division multiplex communication by a spread spectrum system.

2. Related Background Art

In a spread spectrum communication, there is considered a code division multiplex communication system in which by using low cross-correlation characteristics of diffusion codes, a plurality of communication paths are multiplexed in the same band and a information transmission speed is raised.

Especially in the code division multiplex communication of a synchronization system, by using orthogonal series in which cross-correlation values are equal to zero as diffusion codes, an interference between the codes can be completely eliminated. For example, there is a code division multiplex modulation/demodulation apparatus of the type in which a synchronization clock is individually given by a wire system by using orthogonal codes comprising M series.

In a wireless spread spectrum communication, however, a demodulator has to obtain a code synchronization from the reception signal. Therefore, a receiver generally has a correlator, a diffused reception signal and a diffusion code for synchronization are input to the correlator, and an autocorrelation peak of an output waveform of the correlator is detected, thereby capturing and holding the code synchronization of the diffusion codes.

In the case where a communication path is multiplexed by a code division multiplex by using a plurality of orthogonal codes, the periodic cross-correlation between the orthogonal codes which are used for synchronization and the other orthogonal codes appears as noises in an output of the correlator. Generally, there are positions where the periodic cross-correlation values of the orthogonal codes are not equal to zero at positions out of the synchronization point (when the phase is deviated). When the number of code division multiplexes increases, the cross-correlation values from the other channels for the synchronization channel are accumulated and the noise level increases.

In the communication by the PSK modulation, the accumulated cross-correlation value is largely fluctuated by the information bits of each channel. As a result, the output of the correlator on the reception side has large values at random at positions out of the synchronization point, so that it is difficult to discriminate the autocorrelation peak of the synchronization channel.

Now assuming that the code synchronization could be captured, in order to hold the synchronization after that, a synchronization point (or sync point) must be clearly identified near it in the output of the correlator.

For example, as shown in FIG. 8, at a point which is away from the synchronization point by one chip, when a cross-correlation 202 which is larger than an autocorrelation peak 201 of the synchronization channel (or sync channel) appears from another channel, a width of the peak to discriminate the synchronization point is widened like an output of a correlator 203.

Further, since the cross-correlation 202 largely varies by the information bits of each channel, the width of the peak or a signal intensity changes, so that it is difficult to always stably discriminate the synchronization point from the output of the correlator.

As mentioned above, even after the synchronization was established, when a large cross-correlation from channels other than the synchronization channel appears in the output of the correlator at a position near the synchronization point, it is impossible to hold the code synchronization or a demodulation error occurs due to a time-dependent fluctuation in the output of the correlator. Since such phenomena become typical as the number of code division multiplexes increases, the multiplex number cannot be set to a large value in the conventional code division multiplex communication and, consequently, it obstructs the realization of a high transmission speed.

SUMMARY OF THE INVENTION

It is an object of the present invention to raise a transmission speed of a code division multiplex communication.

It is another object of the invention to increase the number of multiplexes of the code division multiplex communication.

It is still another object of the invention to provide an apparatus which can certainly capture a synchronization in the code division multiplex communication.

Still another object of the invention is to stabilize a synchronization holding in the code division multiplex communication.

Further another object of the invention is to clarify an output of a correlator for synchronization in the code division multiplex communication.

The above and other objects and features of the present invention will become more apparent from the following detailed description and appended claims with reference to the accompanying drawings.

BRIEF DESCRIPTION OF THE DRAWINGS

FIGS. 2A to 2C are explanatory diagrams showing examples of diffusion codes of orthogonal M series which are used in the first embodiment of the invention;

FIGS. 4A to 4C are explanatory diagrams showing examples of diffusion codes of orthogonal GMW series which are used in second and third embodiments of the invention;

DETAILED DESCRIPTION OF THE PREFERRED EMBODIMENTS

In the following embodiments, as diffusion codes, there are used a plurality of orthogonal codes in which even cross-correlation values for sync channels are set to 0 at positions near a code synchronization point, particularly, at the positions of at least two chips before and after such a code sync point or at the position of one chip before or after such a point. When the even cross-correlation values are equal to 0 at the positions near the code sync point, odd cross-correlation values (cross-correlation values in the case where transmission data is inverted such as 0→1 or 1→0) at the same points are also set to very small values.

The orthogonal codes can be constructed by not only the M series but also the GMW series, quadratic residue series, or the like. Generally, when their period are long, a number of orthogonal codes exist. As codes which are used in the code division multiplex communication, a combination of some of those codes is selected. Cross-correlation characteristics which appear in a correlator output are determined in accordance with a method of selecting such a combination in this instance.

If a plurality of codes such that the even cross-correlation values for the code sync channels are set to 0 at positions near the code sync point are selected and multiplexed, the autocorrelation peak at the sync point always clearly appears in the correlator output. Even if the position finely fluctuates with the elapse of time, the synchronization can be correctly held.

Figure 1:
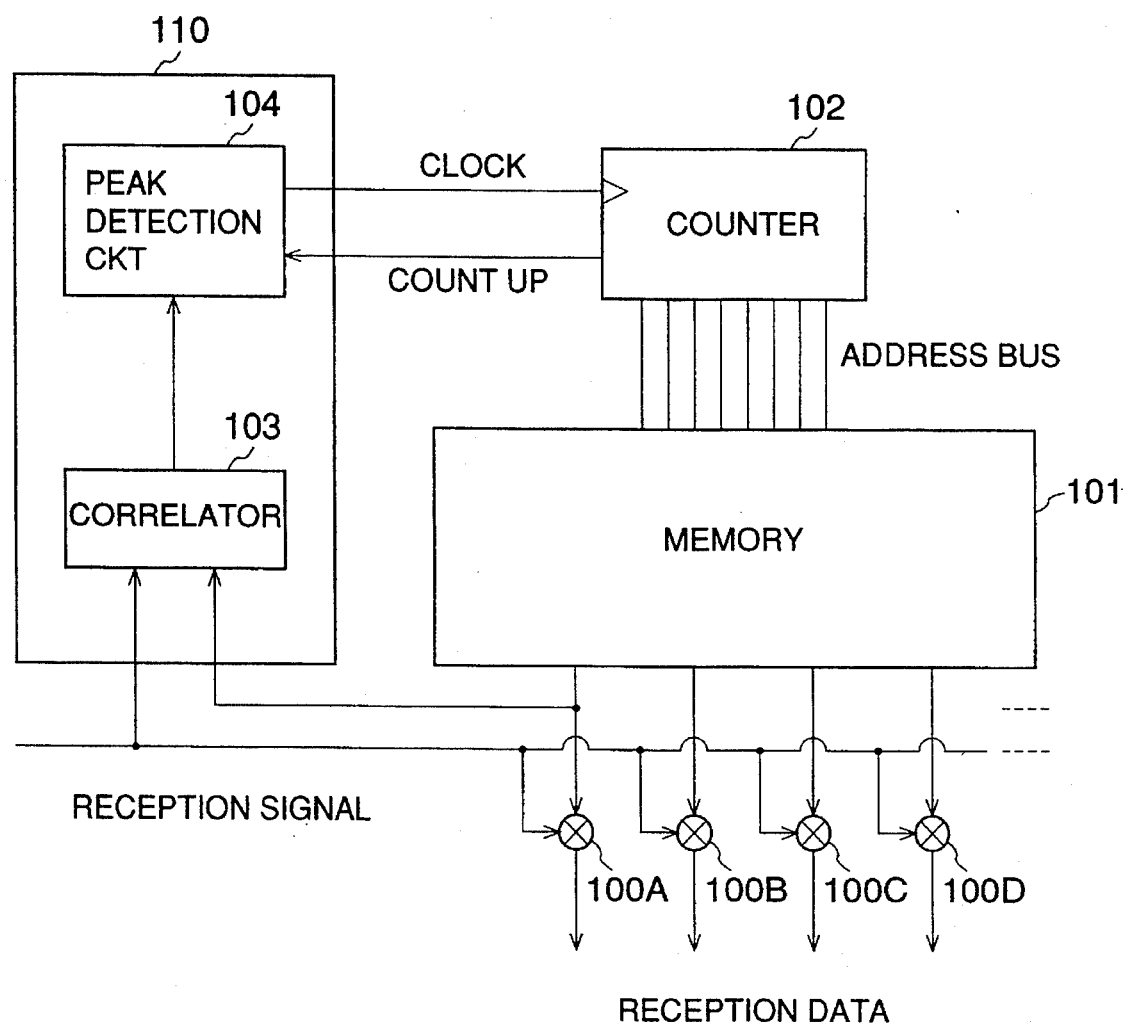
FIG. 1 is a block diagram showing an embodiment of the invention.

FIG. 1 is a block diagram showing a construction of a receiving apparatus including a diffusion code generator in the embodiment of the invention.

In the diagram, data in the address designated by an address bus is output from a memory 101 onto a data bus. Since a plurality of diffusion codes are used in the diffusion code division multiplex system, symbols of those channels are previously made correspond to data bus outputs and are sequentially stored in accordance with the order from address 0 in the memory 101 on the basis of the time series.

Upon communication, by connecting each output of a counter 102 which operates at a chip speed to the address bus of the memory 101, a plurality of diffusion codes are cyclically output from address 0 in the memory 101 in accordance with a clock of a chip speed and a code generator can be constructed.

A synchronization circuit 110 includes a correlator 103 and a peak detection circuit 104. The correlator 103 includes a convolver or the like to obtain a correlation between the reception signal and codes for synchronization which are generated from the memory 101. The peak detection circuit 104 envelope detects a correlation output of the correlator 103 and detects the peak. The peak detection circuit 104 further generates a clock of a frequency that is 256 times as high as a frequency of the peak to a counter 102.

The peak detection circuit 104 adjusts the frequency of the output clock so that the timing when an output value of the counter 102 is equal to "0" coincides with the timing when the output of the correlator 103 is set to the peak value. To realize it, the peak detection circuit 104 includes a PLL circuit for receiving the count-up output of the counter 102 of the 256 notation and the output of the correlator 103 and for comparing their phases.

Reference numerals 100A to 100D denote multipliers to inversely diffuse the reception data from the reception signal.

The case of orthogonal codes which are produced from the M series of a period 255 will now be described as a first embodiment of the invention.

Figures 2A, 2B, 2C:
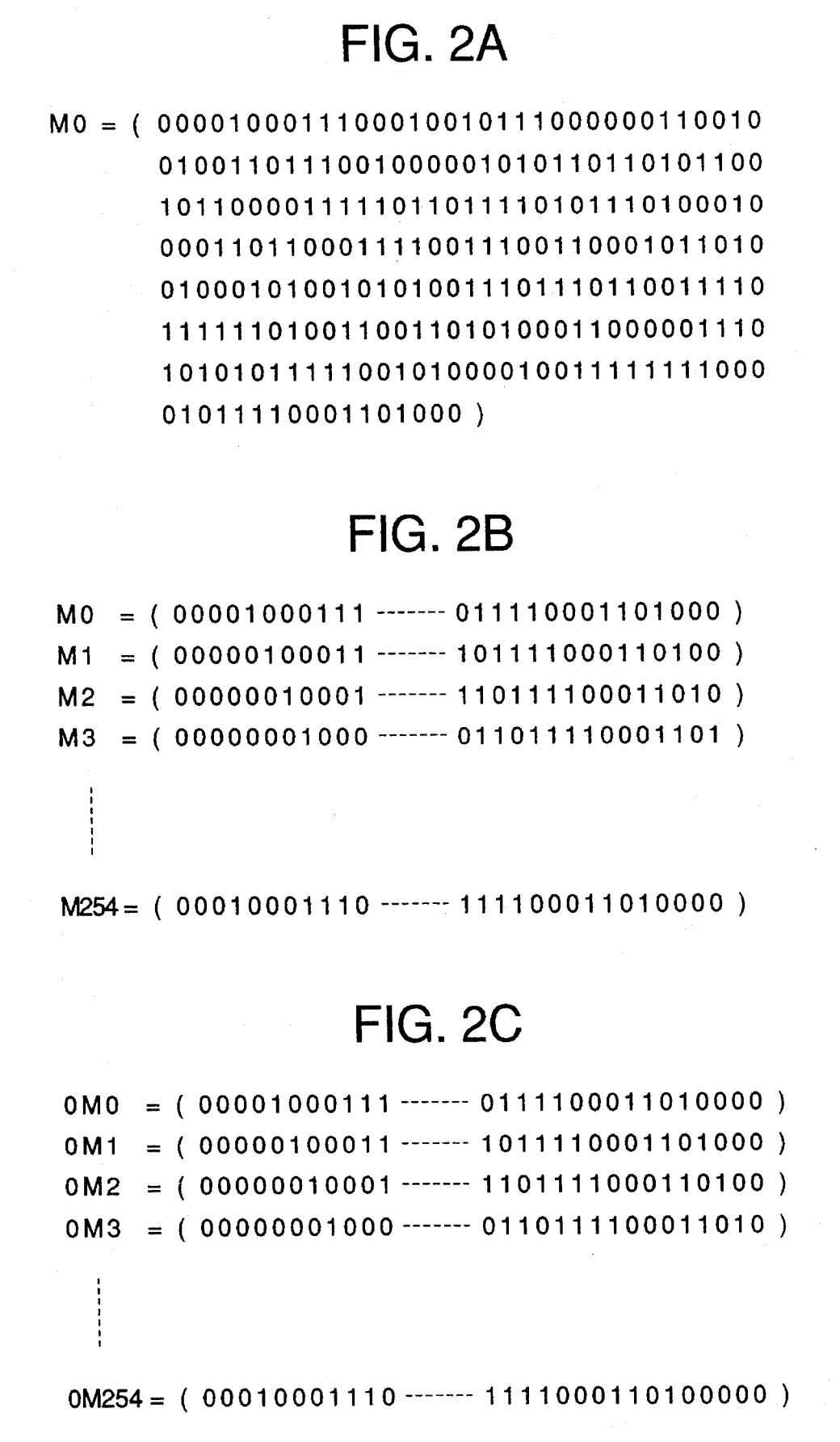

First, series as shown in FIG. 2A are selected as M series constructing the orthogonal codes and are set to M0.

FIG. 2B shows 256 kinds of M series {Mn: n=0, 1, ..., 254} in which M0 was shifted by only (n) chips. FIG. 2C shows the orthogonal series {0Mn: n=0, 1, ..., 254} which are obtained by adding "0" after each of the M series and which have a length of 256 bits.

As an example of a combination of the codes, ten codes of 0M0, 0M1, ..., 0M9 are selected as diffusion codes of the information signal from those orthogonal M series and 0M26 is selected as a diffusion code of a code synchronization and a communication path is multiplexed.

Figure 3:
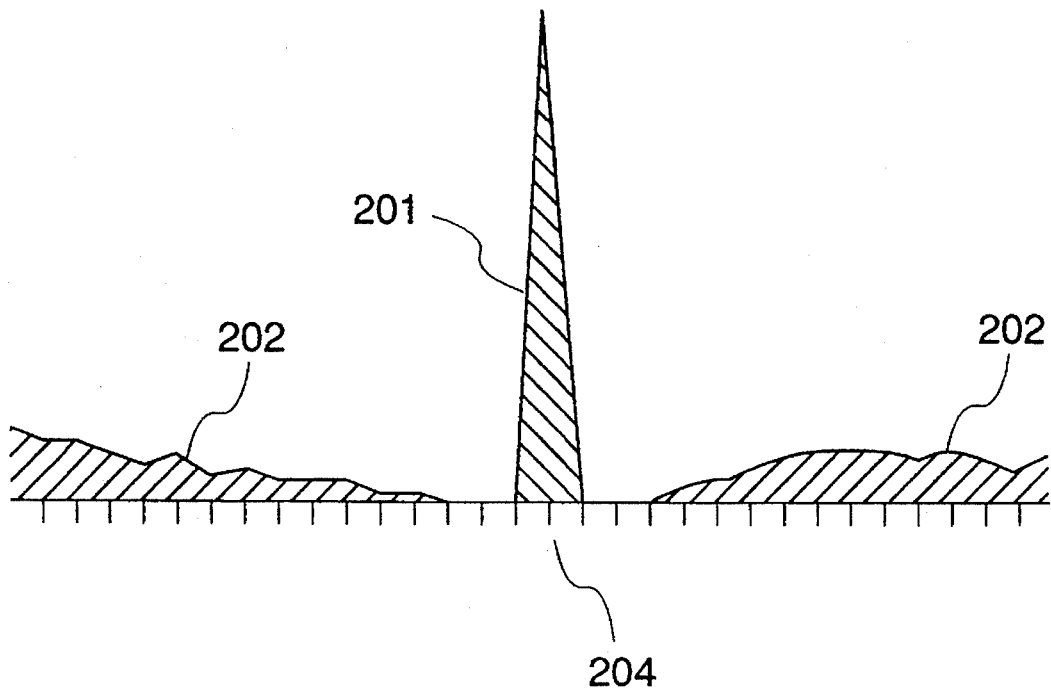
FIG. 3 is a waveform diagram showing an example of an output of a correlator for a code synchronization in the first embodiment.

In this instance, in the case where 0M26 is input as a reference signal and the above multiplexed signal is input as an information signal to the reception side correlator, a state near a synchronization point (also simply referred to as a sync point hereinafter) of the correlator output is as shown in FIG. 3.

At a code sync point 204, an autocorrelation peak of the sync channel appears and the correlator outputs of three chips before and after the code sync point 204 are equal to 0. This is because all of the even cross-correlation values between the sync code 0M26 and the diffusion codes 0M0, 0M1, ..., and 0M9 are equal to 0 at the sync point and at the positions from the sync point to the points which are away from the sync point by three chips on the front and post sides. The odd cross-correlation values are also set to small values in a manner similar to the above. Since the correlation value between the sync point and each channel is extremely small, for instance, in case of using the PSK modulation, the correlator outputs in a range of three chips before and after the sync point are always set to small values with regard to every information bit.

By performing a code division multiplex by the combination of the orthogonal codes as in the embodiment and by obtaining a code synchronization from the correlator output on the reception side, the autocorrelation peak of the sync channel clearly appears at a position near the sync point after the synchronization was captured. Therefore, the synchronization can be held after that.

Even when the radio transmission path changes by the movement of a transceiver and the position of the sync point finely fluctuates, so long as such a fluctuation lies within a range of three chips before and after the sync point, the signal can be demodulated at the normal sync point and a pull-out also doesn't occur.

It is sufficient that such a fluctuation lies within a range of two chips before and after the sync point if there is no need to consider the movement of the transceiver.

The case of the orthogonal codes which are produced from the GMW series of the period 255 will now be described as a second embodiment of the invention.

First, series as shown in FIG. 4A are selected as GMW series constructing the orthogonal series and are set to GMW0.

FIG. 4B shows 255 kinds of GMW series {GMWn: n=0, 1, ..., 254} in which GMW0 was shifted by only (n) chips. FIG. 4C shows the orthogonal GMW series {0GMWn: n=0, 1, ..., 254} in which "0" was added after each of those GMW series and which have a length of 256 bits.

Thirty codes of 0GMW0, 0GMW1, ..., 0GMW29 are selected as diffusion codes of the information signal from those orthogonal GMW series, 0GMW113 is selected as a diffusion code of the code synchronization, and the communication path is multiplexed.

Figure 5:
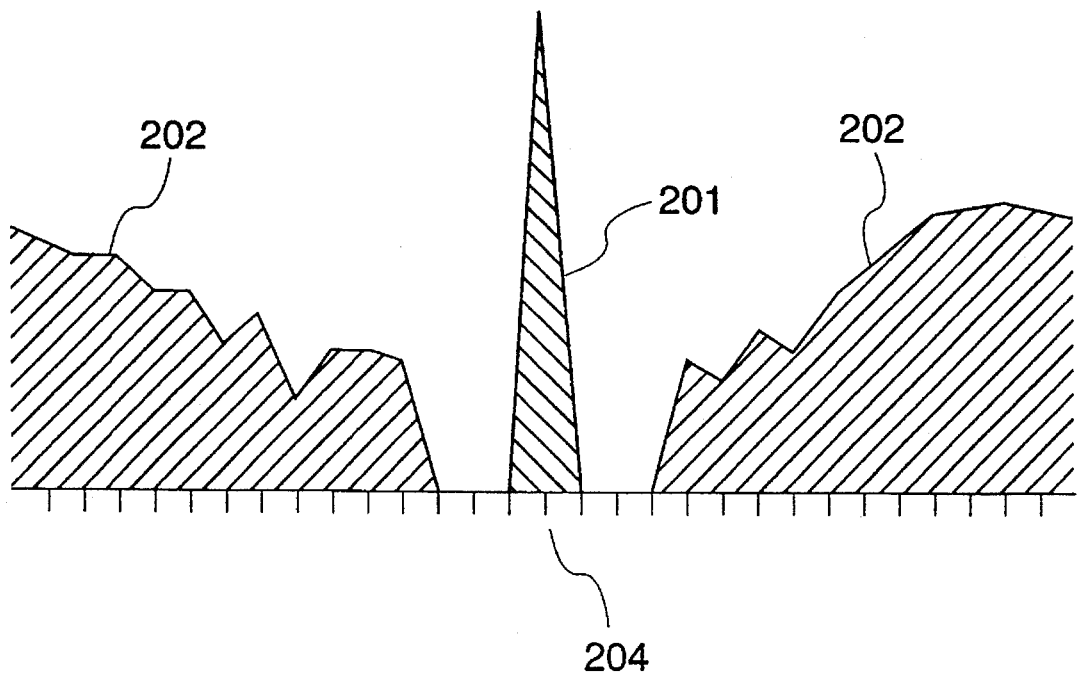
FIG. 5 is a waveform diagram showing an example of an output of a correlator for a code synchronization in the second embodiment.

In this instance, in the case where 0GMW113 is input as a reference signal and the multiplexed signal is input as an information signal to the reception side correlator, a state near the sync point of the correlator output is as shown in FIG. 5.

A construction of the receiving apparatus is common to that shown in FIG. 1.

Since the number of code division multiplexes is larger than that in the first embodiment mentioned above, the cross-correlation 202 is large. However, since the even cross-correlation values are equal to 0 in a range of three chips before and after the code sync point 204 in a manner similar to the first embodiment, an effect similar to that in the first embodiment is derived.

Although the orthogonal M series and the orthogonal GMW Series have been used as diffusion codes in the above first and second embodiments, other orthogonal codes such as orthogonal codes which are produced from the quadratic residue or the like can be also used.

Further, the sync channel can be also handled as a channel which is used only for synchronization without performing the information modulation. The information can be also transmitted by using the channel as shown in FIG. 1.

The case of the orthogonal codes which are produced from the GMW series of the period 255 in a manner similar to the above second embodiment will now be described as a third embodiment of the invention.

In the third embodiment, thirty codes of 0GMW1, 0GMW2, . . . , 0GMW30 are selected as diffusion codes of the information signal from the orthogonal GMW series in FIGS. 4A to 4C, 0GMW0 is selected as a diffusion code of the code synchronization, and the communication path is multiplexed.

Figure 6:
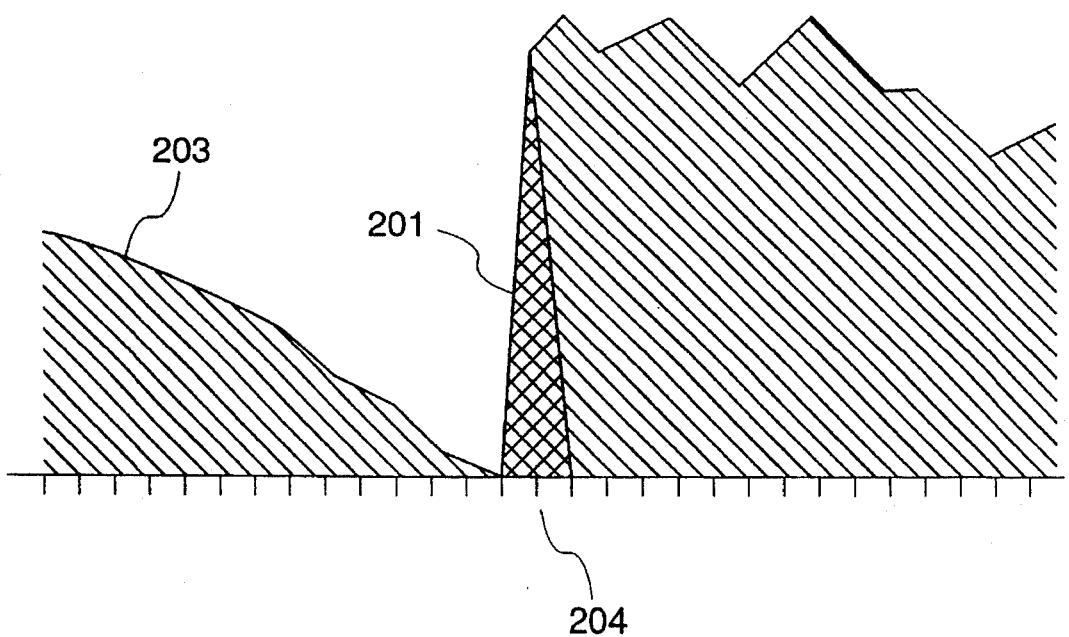
FIG. 6 is a waveform diagram showing an example of an output of a correlator for a code synchronization in the third embodiment.

In this instance, in the case where 0GMW0 is input as a reference signal and the multiplexed signal is input as an information signal to the reception side correlator, a state near the sync point of the correlator output is as shown in FIG. 6.

Figure 7:
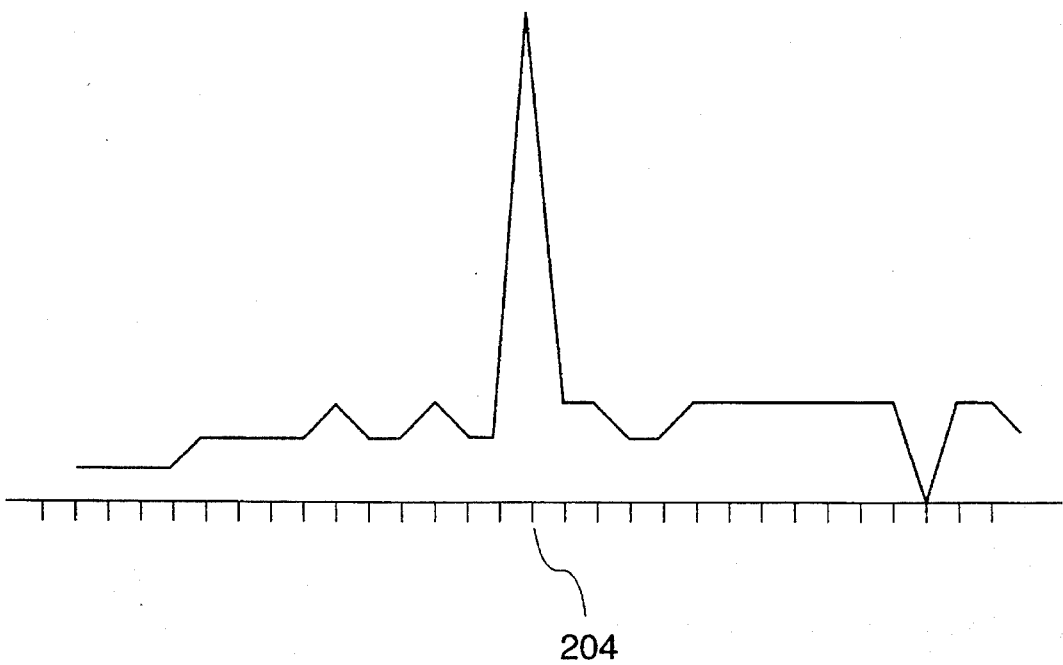
FIG. 7 is a waveform diagram showing a signal which is obtained by differentiating the output of the correlator shown in FIG. 6.
Figure 8:
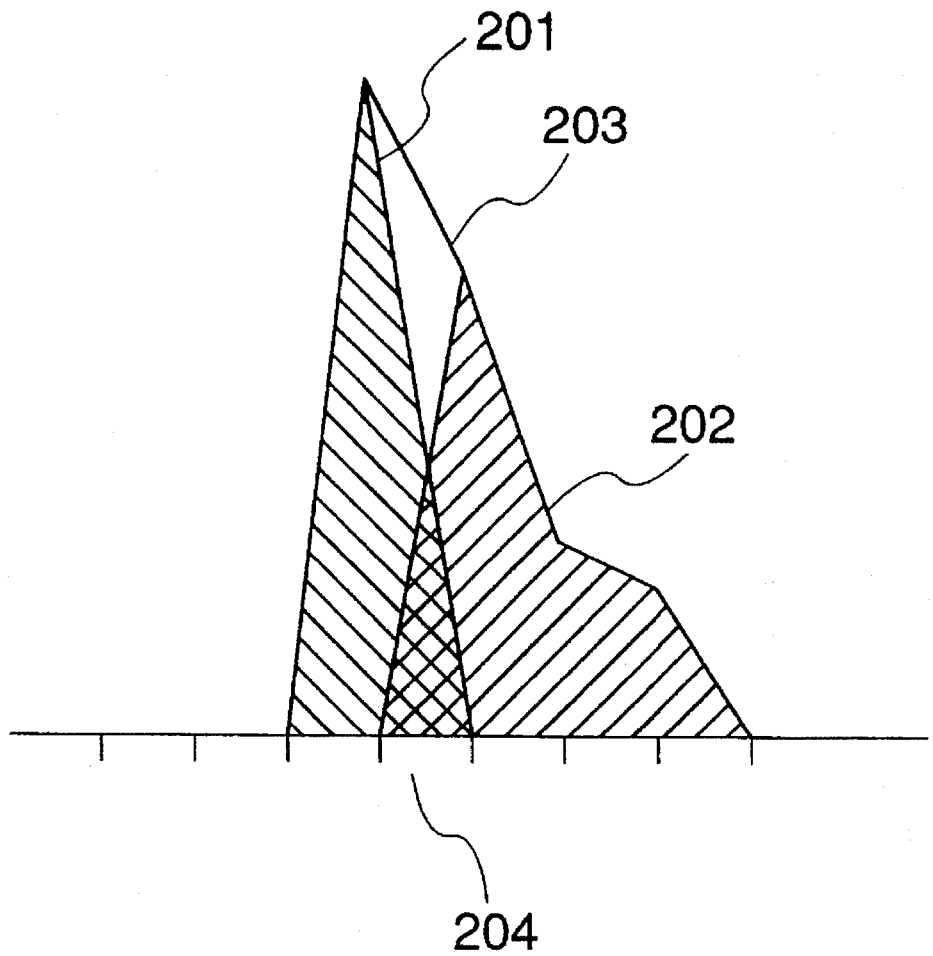
FIG. 8 is a waveform diagram showing an example of an output of a correlator in which a synchronization point is hardly discriminated.

At this time, it will be understood that the levels of the correlator output at the sync point and at a time point of one chip before it largely change. By differentiating the output signal and by further obtaining the absolute value, a clear peak is obtained at the sync point as shown in FIG. 7. Therefore, such a correlation peak is discriminated and the synchronization can be held.

A construction of the embodiment is substantially common to that shown in FIG. 1 except that the peak detection circuit 104 envelope detects the output of the correlator 103 and differentiates it and detects the peak after that.

Although the orthogonal GMW series have been used as diffusion codes in the above third embodiment, other orthogonal codes such as orthogonal codes which are produced from the orthogonal M series or the quadratic residue or the like can be also used.

In the above third embodiment, the correlator output levels at the sync point and at a time point of one chip before it have largely been changed. However, such levels can be also largely changed at the sync point and at a time point of one chip after it.

Further, the sync channel can be also handled as a channel which is used only for synchronization without performing the information modulation. Information can be also transmitted by using such a channel in a manner similar to FIG. 1.

Although the present invention has been described in detail above with respect to the preferred embodiments, the invention is not limited to the above embodiments and constructions. In place of directly generating a plurality of sets of codes in parallel from the memory, it is also possible to sequentially input one set of codes to shift registers and to read out them in parallel from the shift registers. Many modifications and variations of the present invention are possible within the spirit and scope of the appended claims of the invention.

What is claimed is:

1. A receiving apparatus for receiving a code-division-multiplexed signal, comprising:

generating means for generating a sync code for synchronization and a plurality of sets of spreading codes other than the sync code;

correlating means for obtaining a correlation between the code-division-multiplexed signal and the sync code generated by said generating means, the code-division-multiplexed signal including the sync code and the plurality of sets of spreading codes; and de-spreading means for de-spreading the code-division-multiplexed signal on the basis of the plurality of sets of spreading codes generated by said generating means, wherein said generating means generates the sync code such that cross-correlation value between the plurality of sets of spreading codes and the sync code obtained by said correlating means is set to very small at a period near a code synchronization point.

2. An apparatus according to claim 1, wherein said generating means generates the sync code for synchronization such that the cross-correlation value is sufficiently smaller than an autocorrelation peak of the sync code.

3. An apparatus according to claim 1, wherein said generating means generates the sync code for synchronization such that the cross-correlations values are set to very small values at both of the points before and after the code synchronization point.

4. An apparatus according to claim 1, wherein said generating means generates the sync code for synchronization such that the cross-correlation value is set to a very small value at either one of the positions before and after the code synchronization point.

5. An apparatus according to claim 4, further comprising differentiating means for differentiating a correlation output of said correlating means, and wherein said generating means generates the sync code and the plurality of sets of spreading codes in accordance with an output of said differentiating means.

6. An apparatus according to claim 1, wherein said generating means generates the sync code and the plurality of sets of spreading codes synchronously with a correlation output of said correlating means.

7. An apparatus according to claim 1, wherein said de-spreading means has multiplying means for multiplying the plurality of sets of spreading codes and the code-multiplexed signal.

8. An apparatus according to claim 1, wherein said generating means generates a code which is obtained by adding data of a predetermined value to a reference orthogonal code as the sync code and also generates a plurality of codes which are obtained by adding data of a predetermined value to each of the plurality of codes which are obtained by shifting the reference orthogonal code by each of different numbers of bits as the plurality of sets of spreading codes.

9. An apparatus according to claim 8, wherein the reference orthogonal code and each of the plurality of codes are deviated by a predetermined number of bits or more.

10. An apparatus according to claim 1, wherein said generating means generates the sync code such that the cross-correlation value and an autocorrelation value do not overlap each other.

11. A method for receiving a code-division-multiplexed signal, comprising the steps of:

generating a sync code for synchronization and a plurality of sets of spreading codes other than the sync code;

obtaining a correlation between the code-division-multiplexed signal and the sync code generated in said generating step, the code-division-multiplexed signal including the sync code and the plurality of sets of spreading codes; and de-spreading the code-division-multiplexed signal on the basis of the plurality of sets of spreading codes generated in said generating step, wherein the sync code is generated such that cross-correlation value between the plurality of sets of spreading codes and the sync code obtained in said correlating step is set to very small at a period near a code synchronization point.

12. A method according to claim 11, wherein the sync code for synchronization is generated such that the cross-correlation value is sufficiently smaller than an autocorrelation peak of the sync code.

13. A method according to claim 11, wherein the sync code for synchronization is generated such that the cross-correlation values are set to very small values at both of the points before and after the code synchronization point.

14. A method according to claim 11, wherein the sync code for synchronization is generated such that the cross-correlation value is set to a very small value at either one of the positions before and after the code synchronization point.

15. A method according to claim 14, further comprising a differentiating step of differentiating a correlation obtained in said correlating step, and wherein the sync code and the plurality of sets of spreading codes are generated in accordance with the correlation differentiated in said differentiating step.

16. A method according to claim 11, wherein the sync code and the plurality of sets of spreading codes are generated synchronously with a correlation obtained in said correlating step.

17. A method according to claim 11, wherein said de-spreading step has a multiplying step of multiplying the plurality of sets of spreading codes and the code-division-multiplexed signal.

18. A method according to claim 11, wherein a code which is obtained by adding data of a predetermined value to a reference orthogonal code is generated as the sync code and also a plurality of codes which are obtained by adding data of a predetermined value to each of the plurality of codes which are obtained by shifting the reference orthogonal code by each of different numbers of bits are generated as the plurality of sets of spreading codes.

19. A method according to claim 18, wherein the reference orthogonal code and each of the plurality of codes are deviated by a predetermined number of bits or more.

20. A method according to claim 11, wherein the sync code is generated such that the cross-correlation value and an autocorrelation value do not overlap each other.

* * * * *